United States Patent [19]

Themy

[11] 4,316,787
[45] Feb. 23, 1982

[54] HIGH VOLTAGE ELECTROLYTIC CELL

[76] Inventor: Constantinos D. Themy, 4984 S. 360 West, Murray, Utah 84106

[21] Appl. No.: 159,174

[22] Filed: Jun. 13, 1980

Related U.S. Application Data

[63] Continuation of Ser. No. 64,073, Aug. 6, 1979, Pat. No. 4,236,992.

[51] Int. Cl.³ .................. C25B 9/00; C25B 11/08; C25B 11/10; C25B 9/04
[52] U.S. Cl. .................... 204/242; 204/228; 204/278; 204/290 F; 204/271
[58] Field of Search .............. 204/95, 242, 290 R, 204/290 F, 228, 278, 271

[56] References Cited

U.S. PATENT DOCUMENTS 3,759,813  9/1973  Raetzsca et al. ............... 204/290 R
4,212,725  7/1980  Habermann et al. ........... 204/290 R Primary Examiner—R. L. Andrews
Attorney, Agent, or Firm—Phillips, Moore, Weissenberger, Lempio & Majestic

[57] ABSTRACT

A novel electrode, an apparatus and a method are set out for electrolyzing a chloride ion containing aqueous solution to produce chlorine and ozone. Through utilization of a solid state rectifier network, and without the use of a transformer, full line voltage, after rectification, is applied between the anode and cathode of an electrolytic cell utilizing an anode which is a laminated body of a platinum group metal foil bonded to a tantalum or niobium layer which in turn is bonded to a titanium substrate. Chlorine and ozone production is quite rapid.

2 Claims, 4 Drawing Figures

HIGH VOLTAGE ELECTROLYTIC CELL

This is a continuation of Ser. No. 64,073, filed Aug. 6, 1979, U.S. Pat. No. 4,236,992.

BACKGROUND OF THE INVENTION

1. Field of the Invention

The invention relates to a method and apparatus for electrolyzing a brine solution to produce chlorine and ozone. The chlorine and ozone produced are then utilized to purify water or for any other purpose.

2. Prior Art

The production of chlorine and ozone in electrolytic cells is well-known. For example, such as discussed in U.S. Pat. No. 3,443,055 of R. M. Gwynn and T. Themy issued May 6, 1969, in U.S. Pat. No. 3,479,275, issued on Nov. 18, 1969, also to R. M. Gwynn and T. Themy and in U.S. Pat. No. 3,616,355, issued Aug. 5, 1968 to T. Themy and R. M. Gwynn.

In the past, the rate of production of chlorine and ozone has been limited since the use of voltages between the anode and cathode of such electrolytic cells of above about 10 or 12 volts for more than very short periods of time results in a breakdown in the electrolytic reaction through pitting and generally catastrophic damage to the electrodes. While operating for short times at higher voltages, e.g., up to about 200 volts, is known with anodes which comprise a platinum group metal foil bonded to a titanium substrate (see, for example, aforementioned U.S. Pat. No. 3,616,355), on continued operation at such voltages the titanium substrate is shortly severly attacked, pitted and decomposed. Accordingly, whenever such cells have been utilized for extended periods of time, the voltage has been kept down to 12 volts DC or less. When utilizing an AC power source, it has been necessary to run the current through a transformer to reduce it to 12 volts or less and then to rectify the reduced voltage current to provide the needed DC-like potential.

It is clear that it would be advantageous to operate for extended periods of time at higher voltages if such were possible, since this would lead to a much higher rate of production of chlorine and ozone from a cell, thus allowing quicker generation of high levels of disinfecting or sterilizing chemicals within any one cell.

SUMMARY OF THE INVENTION

In one sense, the invention relates to a novel electrode which is usable for extended periods of time at voltages above about 20 volts. The electrode comprises a platinum group metal foil bonded to a tantalum or niobium layer which in turn is bonded to a titanium substrate to form a laminated sandwich structure.

In another sense, the invention relates to a method of electrolyzing a chloride ion containing aqueous solution to produce chlorine. The method comprises positioning a brine solution, which is substantially free of halides other than chloride ion, in an electrolytic cell between a cathode and an anode, the anode comprising the electrode just described. A DC voltage of at least 12 volts is applied for an extended period of time between the anode and the cathode.

In yet another sense, the invention relates to an apparatus for electrolyzing a chloride ion containing, and other halide ion substantially free, aqueous solution to produce chlorine. The apparatus comprises a vessel having a cathode therein. The vessel also has an anode of the nature just described above. A rectifying circuit forms a part of the apparatus. The rectifying circuit has a pair of AC inputs, a negative output and a positive output. A first of a pair of cell conductors connects the negative output to the anode and a second of the pair of cell conductors connects the positive output to the cathode. A pair of AC conductors directly connect the AC inputs to receive substantially the full AC voltage from a power source having a voltage of above about 20 volts.

Through operating in accordance with the present invention, chlorine and ozone can be produced for extended periods of time at much higher rates than with prior art apparatus which operated for extended time periods only at relatively low voltages. Further, such bulky, heavy and expensive equipment as step down transformers are not needed, and would indeed detract from the apparatus.

BRIEF DESCRIPTION OF THE DRAWINGS

The invention will be better understood by reference to the figures of the drawing wherein like numbers denote like parts throughout, and wherein.

DETAILED DESCRIPTION OF THE PREFERRED EMBODIMENTS

Figures 1, 2:
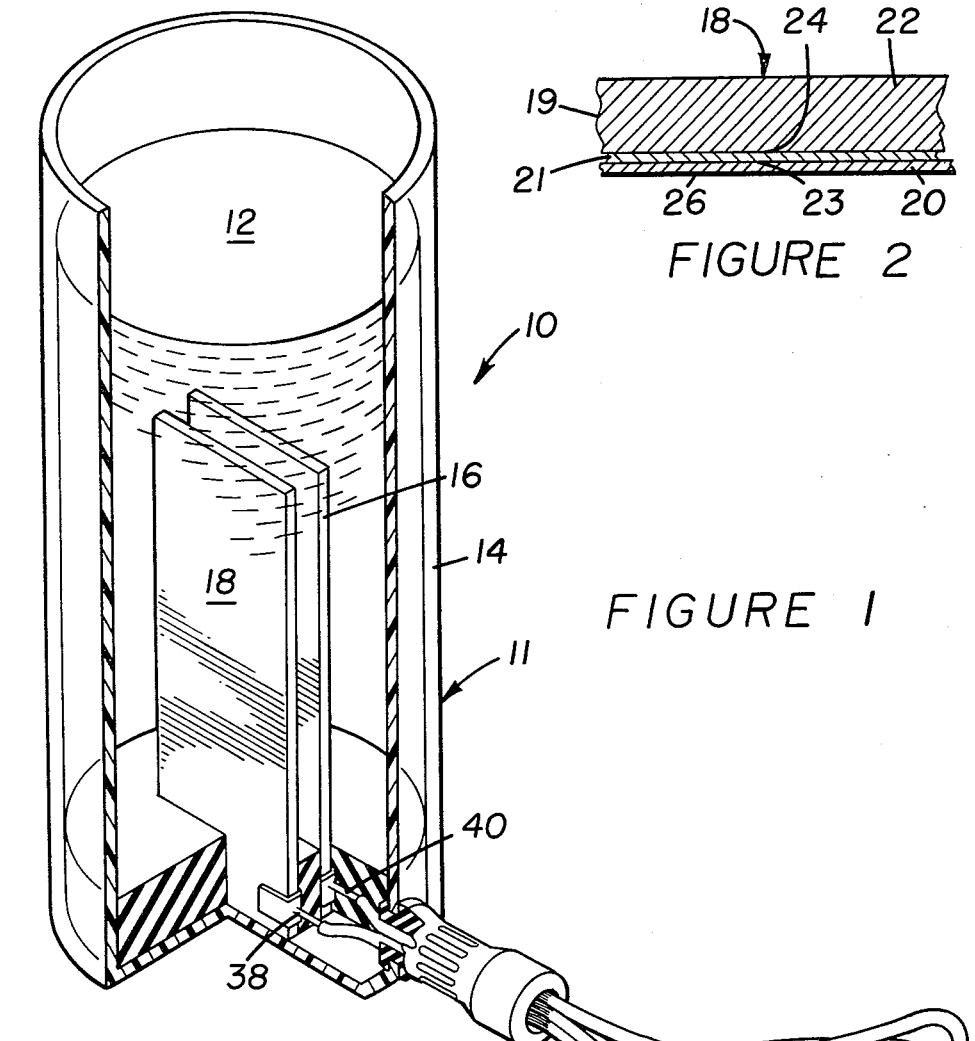
FIG. 1 illustrates, in perspective, an electrolytic cell in accordance with the present invention.
FIG. 2 illustrates, in partial view in side section, an anode in accordance with the present invention.

Adverting to FIG. 1, there is illustrated therein an apparatus 10 which includes a cell 11 for electrolyzing a chloride ion containing and other halide ions substantially free aqueous solution 12 to produce chlorine. The cell 11 includes a vessel 14, which may be a clear plastic cup, e.g., polymethyl methacrylate. The vessel 14 has therein a cathode 16 and an anode 18.

The composition of the cathode 16 is not critical to the invention. However, the composition of the anode 18 is quite critical. In particular, the anode 18 (FIG. 2) must comprise a laminated body 19 of a platinum group metal foil 20 bonded to a niobium or tantalum layer 21 which in turn is bonded to compatible metal substrate 22 which is highly resistant to electrolytic oxidation. The platinum group metal must be selected from the group consisting of platinum, rhodium, iridium and ruthenium and alloys thereof. The metal substrate 22 must be titanium. The laminated body 19 has a bonding alloy zone 23 at most of the interface between the foil 20 and the layer 21. A bonding alloy zone 24 is at most of the interface between the layer 21 and the substrate 22. An outer surface 26 of the foil 20 must be unaltered by the alloy zones 23 and 24.

A method of making two layer electrodes is discussed in detail in U.S. Pat. No. 3,443,055. The method is to press a platinum group metal foil onto a substrate of titanium, tantalum or niobium with a roller-electrode while passing a current through a moving linear contact zone therebetween and into a massive backing electrode behind the substrate. This method can be used to prepare the electrode of the present invention in a single step by positioning the tantalum or niobium sheet or layer between the platinum group metal foil 20 and the titanium substrate 22 and then performing the pressing-bonding operation.

The anode 18 does not necessarily need the foil 20 and layer 21 bonded to all surfaces of the substrate 22, although such may be desirable with certain geometries of the cell 11. FIG. 2 shows the foil 20 and layer 21 bonded to only one surface of the substrate 22.

Spacing between cathode 16 and anode 18 is not critical and can vary within wide ranges depending upon ultimate use requirements for the apparatus 10.

It will be noted that electrodes in accordance with the present invention are useful for extended periods of time, well over about 2 days. Also, watt densities of 100 to 1000 watts per square inch of platinum group metal surface can be handled for such extended time periods.

A rectifying circuit 28, shown as a box in FIG. 1, also forms a part of the apparatus. Basically, the rectifying circuit 28 has a pair of AC inputs 30 and 32, a negative output 34 and a positive output 36 (See FIGS. 3 and 4). A pair of cell conductors 38 and 40 are also provided. The cell conductor 38 connects the negative output 36 to the anode 18. The other of the cell conductors 40 connects the positive output 34 to the cathode 16. A pair of AC conductors 42 and 44 directly connect the AC inputs 30 and 32 to receive substantially the full AC voltage from a power source 46 which puts out a voltage of above about 12 volts. Generally the voltage put out will be above about 20 volts and more usually above about 100 volts. This allows direct 115 volt and 230 volt current to be utilized in the apparatus 10 for extended periods of time.

The rectifier circuit 28 rectifies the AC voltage from the power source 46 and converts it to DC voltage of generally the same voltage as that put out by the power source 46. Thus, the cell conductors 38 and 40 apply a voltage of at least 12 volts, more usually at least 20 volts, and preferably above about 100 volts, between the anode 18 and the cathode 16.

It should be particularly noted that a transformer is not used between the power source 46 and the cathode and anode 16 and 18.

In accordance with a preferred embodiment of the invention (FIGS. 3 and 4), the apparatus 10 is useful with at least a first battery 48, which first battery has an accessible positive terminal 50 and an accessible negative terminal 52. A first pair of DC conductors 54 and 56 are provided, a first 54 of which is connected to the anode 18 and a second 56 of which is connected to the cathode 16. A first plug 58 is connected to the first pair of DC conductors 54 and 56 and is adapted to form an electrical connection of the first DC conductor 54 to the negative terminal 52 and of the second DC conductor 56 to the positive terminal 50, of the first battery 48. For example, the first battery 48 might comprise an automobile battery, in which case the first plug 58 might be adapted for plugging into the cigarette lighter to the automobile.

It is further preferred that a second battery 60 be provided which has an accessible positive terminal 62 and an accessible negative terminal 64. The positive terminal 62 and negative terminal 64 of the second battery 60 will normally be of a different configuration than are the positive terminal 50 and negative terminal 52 of the first battery 48. For example, the positive terminal 62 and the negative terminal 64 might be simply lugs on a dry cell battery, thus allowing the apparatus 10 to be used in wilderness areas. A second pair of DC connectors 66 and 68 are provided. A first 66 of these conductors is connected to the anode 18 and a second 68 thereof is connected to the cathode 16. A second plug 70 is provided which is a different construction than the first plug 58.

The second plug 70 is connected to the second pair of DC conductors 66 and 68 and is adapted to form an electrical connection of the first DC conductor 66 to the negative terminal 64 of the second battery 60 and an electrical connection of the second DC conductor 68 to the positive terminal 62 of the second battery 60. The second plug 70, for example, can be a pair of alligator clips for universal attachment to different types of battery terminals.

Figure 3:
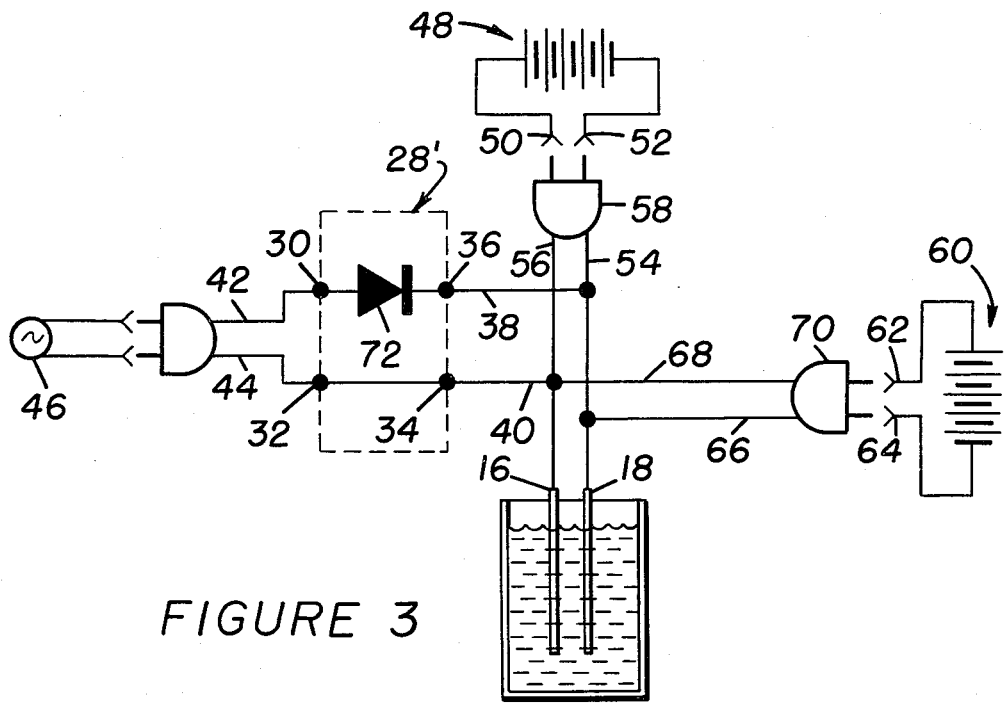
FIG. 3 illustrates, schematically, a first rectifier circuit useful in the practice of the present invention.

Adverting now only to FIG. 3, there is shown therein a conventional half-wave rectifier circuit 28' which would be one embodiment of the rectifier circuit 28 shown in FIG. 1. A single diode 72 provides the needed rectification without the use of any transformer.

Figure 4:
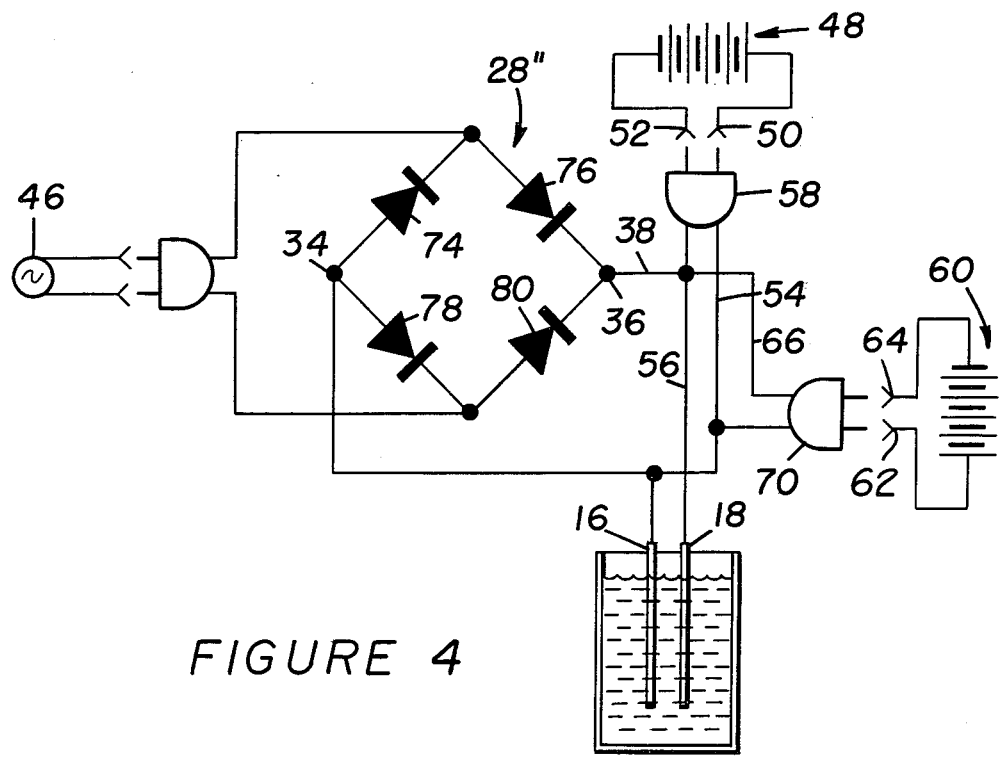
FIG. 4 illustrates, schematically, an alternate rectifier circuit useful in the practice of the present invention.

Referring now only to FIG. 4 there is shown therein a conventional full wave rectifier circuit 28'' which utilizes four diodes 74, 76, 78 and 80 and which constitutes an alternate embodiment of the rectifier circuit 28.

It has been found, most surprisingly, that when utilizing an apparatus 10 and electrode 18 as described above, and when operating in accordance with the method disclosed above, the apparatus 10 will effectively, and for extended periods of time, produce chlorine and ozone without any harm to the anode 18 whereat the chlorine and ozone is being generated and that these constitutents can be generated at a much higher rate than at lower voltages. This is a completely unexpected result since anode breakdown occurs with any other electrode known and used in such cells if an attempt is made to apply voltages above about 12 volts thereto for any significant period of time. Further, the apparatus 10 is particularly advantageous in some of its perferred embodiments in that it can be used with one or more DC power sources as well as being useful with 115 volt or even 230 volt AC power sources.

The following table demonstrates the relative terms usefulness of electrodes (anodes) in accordance with the present invention (specifically, a 0.025 mm thick platinum-iridium foil (about 70% platinum, 30% iridium) bonded to an 0.025 mm thick tantalum sheet which is bonded to a 2 mm thick titanium substrate) and prior art electrodes (specifically, an identical 0.025 mm thick platinum-iridium foil bonded directly to a 2 mm thick titanium substrate). Electrode spacing and size varied but was the same for electrodes tested at the same volt-amp values.

| Electrode | Salinity ppm | Volts | Amps | Titanium Condition after elapsed time | | | | |
| --- | --- | --- | --- | --- | --- | --- | --- | --- |
| | | | | 1 Hour | 12 Hours | 24 Hours | 2 Days | 4 Weeks |
| Prior Art | 150 | 200 | 2 | Microscopically Pitted | Visibly Pitted | Badly Pitted | Useless, about 25% gone | — |
| Invention | 150 | 200 | 2 | *Unaffected | Unaffected | Unaffected | Unaffected | Unaffected |
| Prior Art | 50 | 100 | 11 | Microscopically | Visibly Pitted | Badly Pitted | Useless, about 25% | — |

-continued

| Electrode | Salinity ppm | Volts | Amps | 1 Hour | 12 Hours | 24 Hours | 2 Days | 4 Weeks |
|---|---|---|---|---|---|---|---|---|
| | | | | Pitted | | | gone | |
| Invention | 50 | 100 | 11 | Unaffected | Unaffected | Unaffected | Unaffected | Unaffected |
| Prior Art | 5,000 | 22 | 180 | Badly Pitted | Useless, about 25% gone | — | — | — |
| Invention | 5,000 | 22 | 180 | Unaffected | Unaffected | Unaffected | Unaffected | Unaffected |
| Prior Art | 3,000 | 17 | 25 | Badly Pitted | Useless, about 25% gone | — | — | — |
| Invention | 3,000 | 17 | 25 | Unaffected | Unaffected | Unaffected | Unaffected | Unaffected |

The term "unaffected" means that no pitting was observed under 100 × magnification.

While the above discussion centers on the production of chlorine and ozone for water purification, such chlorine and ozone can also be used for any other desired purpose, e.g., mild scalp treatments to combat dandruff, bleaching operations, etc.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features herein before set forth, and as fall within the scope of the invention and the limits of the appended claims.

I claim:

1. An apparatus for electrolyzing a chloride ion containing, and other halide ion substantially free, aqueous solution to produce chlorine, comprising:
   a vessel;
   a cathode in said vessel;
   an anode in said vessel, said anode including means for rendering said anode operable at a voltage above about 20 volts and at a watt density above about 100 watts per square inch of surface for over about 2 days without significant deterioration;
   a rectifier circuit having a pair of AC inputs, a negative output, and a positive output;
   a pair of cell conductors, a first of which connects said negative output to said anode and a second of which connects said positive output to said cathode;
   an AC power source supplying a voltage of above about 20 volts; and
   a pair of AC conductors directly connecting said AC inputs to receive substantially the full AC voltage from said power source.

2. An apparatus as in claim 1, wherein said means renders said anode operable at a voltage above about 100 volts for over about 2 days without significant deterioration and wherein said power source supplies a voltage of above about 100 volts.

* * * * *